United States Patent [19]

Kühnel et al.

[11] 4,244,860

[45] Jan. 13, 1981

[54] PLASTIC MOLDING COMPOSITION

[75] Inventors: Werner Kühnel, Neunkirchen-Schoneshof; Karl-Günter Scharf, Troisdorf-Spich; Paul Spielau, Troisdorf-Eschmar; Richard Weiss, Troisdorf, all of Fed. Rep. of Germany

[73] Assignee: Dynamit Nobel Aktiengesellschaft, Fed. Rep. of Germany

[21] Appl. No.: 51,422

[22] Filed: Jun. 25, 1979

Related U.S. Application Data

[63] Continuation of Ser. No. 960,932, Nov. 15, 1978, abandoned.

[30] Foreign Application Priority Data

Dec. 23, 1975 [DE] Fed. Rep. of Germany ....... 2558467

[51] Int. Cl.$^3$ .................................................. C08K 9/06
[52] U.S. Cl. ................................ 260/42.15; 260/42.49
[58] Field of Search ...................................... 260/42.15

[56] References Cited

U.S. PATENT DOCUMENTS 3,915,922  10/1975  Suzuki et al. ..................... 260/42.15

OTHER PUBLICATIONS

Sterman et al., The Effect of Silane Coupling Agents in Improving the Properties of Filled or Reinforced Thermoplastics, Society of Plastics Engineers, Inc., Mar. 1965, 21st Annual Tech. Conf.

*Primary Examiner*—Lewis T. Jacobs
*Attorney, Agent, or Firm*—Craig & Antonelli

[57] ABSTRACT

A process for preventing separation of fillers and other dispersed additives from thermoplastic molding compositions during extrusion, calendering or like processing, along metallic contact surfaces of a processing unit, involves admixing a silane additive to a portion of a thermoplastic molding composition containing a thermoplastic molding resin and at least one filler or other dispersed additive that tends to separate out from the molding composition during the processing, processing the portion of thermoplastic molding composition in a processing unit, measuring the electrical energy applied to the processing unit during processing per kilogram of molding composition per unit time, determining if the electrical energy applied has been increased by the addition of the silane additive as compared to the electrical energy required per kilogram of molding composition per unit time for processing another portion of the thermoplastic molding composition free of the silane additive and thereafter adding an effective amount of the silane additive determined to be capable of increasing the applied electrical energy required to process the molding composition by at least 20% with the thermoplastic molding composition and processing the resulting thermoplastic molding composition in the processing unit. Among the silane additives disclosed as being suitable for this process are $\beta$-chloroethyl triethoxysilane and vinyl trialkoxysilanes containing alkoxy groups having from 1 to 6 carbon atoms.

26 Claims, No Drawings

PLASTIC MOLDING COMPOSITION

This is a continuation of application Ser. No. 960,932, filed Nov. 15, 1978, abandoned.

The invention relates to a plastic molding composition, especially one having a PVC base with fillers.

Thermoplastic plastic molding compositions, especially those that contain PVC, have acquired constantly increasing economic importance in recent years because of their broad range of application, with processing occurring to a considerable extent on extruders, calenders and injection molding apparatus. Depending upon the type and amount of fillers that are added to the thermoplastic material, such as chalk, kaolin, talc, asbestos, etc., and auxiliary materials such as stabilizers, pigments, etc., difficulties often arise in processing when the thermoplastic molding composition comes into contact with the metallic surfaces of the processing apparatus such as screws, tools, rolls, etc. Along these metallic contact surfaces there is deposition of fillers from the molding composition, which deposition leads on the one hand to coating of the metallic surfaces, and on the other hand to changes in the surface of the manufactured product, e.g. webs, plates, sheets, shaped parts, etc; thses changes are also called plate-out. This plate-out does not mean later sweating out on the final product, but rather one that occurs directly in the course of manufacture. The deposits on the metallic surfaces can also lead to combustion or to phenomena of decomposition in the case of heat or sheer-sensitive compositions. In any case, the flow of the composition can be disturbed by the deposits so that acceptable shaping is no longer ensured.

Because of these known phenomena, when such coatings appeared on the metallic surfaces of the processing apparatus, with correspondingly pronounced changes of the product surface, production, i.e. the manufacturing process, had to be interrupted, to clean off the coatings from the apparatus. This entailed not only a drop in production, but also an increased consumption of molding material because of losses in delivery and take-off.

As raw plastics become more expensive, the use of increased amounts of filler is of growing interest, but this met the above-mentioned difficulties, i.e. the danger of increased deposition as the amount of filler increased.

The invention is directed to the problem of developing plastic molding compositions even with fillers that tend to deposit out during the processing on the metallic contact surfaces of the apparatus, where this deposition is prevented and the compositions can be mixed with larger amounts of such fillers.

The problem is solved by the invention in that silanes are added to prevent separation of fillers from the plastic molding compositions during extrusion, calendering or injection molding, which silanes make necessary an increase of the applied energy for processing the compositions per kilogram and per unit of time. It was found surprisingly that deposition in the processing apparatus and surface changes on the product made of plastic molding compositions with those fillers which according to type and quantity lead to the described plate-out, is prevented with additions of selected silanes that alter the rheological behavior of the composition in such a way that increased energy is required for the processing.

The silanes that are suitable according to the invention are, for example, to be determined by measuring the specific electrical current imput of an extruder in processing, per kilogram of molding composition per unit of time, once without addition of a selected silane, and another time with addition of a selected silane. The magnitude of the increase of specific current imput is basically a function of processing conditions, of course, and secondly of the used thermoplastic material and the type and amount of its fillers. It is clearly measurable and indicates the effect of the invention in processing with an extruder. The results which are very simply determinable in processing with an extruder, with reference to determination of suitable silanes for the molding compositions, have been found to be similarly suitable for processing in calenders and injection molding machines. Here also the silanes selected according to the invention, in case of addition of materials to the molding composition that evoke the described plate-out, are capable of preventing this. In this way it is possible to mix polymeric materials that are to be processed thermoplastically in a method not previously available, with large additions of fillers such as chalk, kaolin, etc., without the occurrence of plate-out in the course of processing.

The selected silanes can be added in a concentration of $5 \times 10^{-4}$ to 1.0 parts by weight, calculated as silicon, or 0.005 to 2.0 parts by weight, advantageously 0.2 to 0.5 parts by weight, calculated as a quantity of silane, based on 100 parts by weight of the thermoplastic molding composition. The silane quantity may also be calculated with reference to the monomolecular covering of the specific surface of the fillers that have the tendency to separate out. It was found unexpectedly that even quantities of the selected silanes that are substantially less than that which corresponds to a 100% monomolecular covering of the specific surface of the fillers that tend to separate out suffices to prevent separation or deposition on the processing apparatus. Preferably, according to a further proposal of the invention, the added amount of silane corresponds to a 50 to 100% monomolecular covering of the specific surface of the filler that tends to separate out when it is added to the molding composition. It is also possible to provide a higher proportion of silane, but there would not be any essential increase in the energy requirement by the molding composition, measured during processing in an extruder.

In a further development of the invention, it is proposed that vinyl trialkoxy silanes, advantageously with short chain alkoxy groups, be added to the thermoplastic molding composition, i.e., the alkoxy group contains from 1 to 6 carbon atoms. Such vinyl trialkoxy silanes are, for example, vinyl trimethoxy silane or vinyl triethoxy silane. It is of particular interest that the silanes known from the literature that improve the adherence between PVC and fillers, e.g. aminopropyltriethoxy silane, have not been found to be the most effective compounds for the purpose of the invention. It was also found, unexpectedly, that even chemically homologous silanes that differ only by a supplementary $CH^{-2}$ group, e.g. β-chloroethyl and γ-chloropropyl triethoxy silane, clearly differ in their effectiveness in the sense of the invention, i.e., the former can be used in the sense of the invention and the latter has been found to be unsuitable. The heretofore-disclosed parameter of this invention provides an unequivocal determination of the suitable silanes, i.e., a suitable silane or mixture of silanes is that which causes an increase in the applied energy required to process the molding composition per kilogram per unit time.

With the use of the plastic molding compositions and silanes selected according to the invention, a process is developed for preventing separation of fillers from thermoplastic plastic molding materials, especially PVC, in extrusion, calendering or injection molding, on metallic contact surfaces of the processing apparatus.

The composition of this invention and the process of preventing deposition of filler are discussed below with reference to the following examples.

EXAMPLE 1

Here various silanes are added to a thermoplastic molding composition and the processing conditions are measured. PVC is used as the plastic raw material since this polymer is a widely utilized thermoplastic material that moreover rapidly shows plate-out in processing with the addition of fillers. The mixture was prepared in the usual way in a fluid mixer and extruded to form a sheet or plate, on a double screw extruder with 86 mm. screw diameter and screw length of 16 D, via a slot die. The residence time is on the average 8 minutes in the extruder, then being present on the average an inlet temperature of about 120° C. and an outlet temperature of about 195° C. at the extruder. The following comparisons are provided between the basic mixture or composition A and those including the addition of various silanes: proportions by weight of the silanes to composition A, throughput (kilograms/hour), current imput, ampere (A) of the extruder, specific current imput (Ah/kg), percentage increase in current imput, coating formation on the plate surface, and coating of the tool surface. In judging the change of the surface in the form of streaks and spots on the extruded plate and also the deposits in the zone of the baffle plate of the slot die, the following scores were used:

0 = no streaks/spots/deposits
1 = light streaks/spots/deposits
2 = moderate streaks/spots/deposits
3 = heavy streaks/spots/deposits The results are presented as a compilation in attached Table I, where the indicated amounts of silane according to experiments B to K of Table I correspond to about 100% monomolecular covering of the specific surface of the added fillers and pigments of composition A.

Mixture A comprises:
100 parts by weight S-PVC, K number 65
3 parts by weight lead sulfate
1 parts by weight lead stearate
0.3 parts by weight calcium stearate
1 parts by weight epoxidized soy bean oil
0.3 parts by weight oxystearic acid
1 parts by weight long chain fatty acid ester
10 parts by weight calcium carbonate (specific surface ca 5 m²/g)
1 parts by weight titanium dioxide (rutile type)

The result of extrusion of the above mixture A is represented under experiment A in Table I.

In further extrusion experiments B to K, the silanes of Table I, B to K, were added in the indicated amounts to the above mixture A, and processed and judged as described in the table.

TABLE I

| Experiment | Silane | Silane, parts by wt./100 parts by wt. molding composition A | Throughput (kg./h.) | Current imput of extruder ampere(A) | Specific current imput (Ah/kg) | Percentage increase in current imput | Formation of Deposit Plate surface | Tool |
|---|---|---|---|---|---|---|---|---|
| A | (no silane) | — | 85 | 26 | 0.306 | — | 3 | 3 |
| B | Vinyl-trimethoxy-silane | 0.085 | 85 | 34 | 0.400 | 30 | 0 | 0 |
| C | Vinyl-tri-ethoxy-silane | 0.100 | 86 | 36 | 0.419 | 37 | 0 | 0 |
| D | β-Chloroethyl-tri-ethoxy-silane | 0.125 | 84 | 34 | 0.405 | 32 | 0 | 0 |
| E | γ-Chloropropyl-tri-ethoxy-silane | 0.130 | 85 | 26 | 0.306 | 0 | 3 | 3 |
| F | i-Butyl-tri-methoxy-silane | 0.100 | 90 | 26 | 0.289 | −6 | 3 | 3 |
| G | γ-Mercapto-propyl-trimethoxy-silane | 0.110 | 85 | 28 | 0.329 | 7 | 1–2 | 1 |
| H | γ-Methacryl-oxypropyl-tri-methoxy-silane | 0.140 | 85 | 27 | 0.318 | 4 | 1–2 | 2 |
| J | γ-Aminopropyl-tri-ethoxy-silane | 0.125 | 85 | 31 | 0.365 | 19 | 1–2 | 0 |
| K | Chloromethyl-di-methyl-methoxy-silane | 0.250 | 87 | 25 | 0.287 | −6 | 3 | 3 |

As Table I shows, only the silanes added in experiments B, C and D prevented separation of deposits on the tool or plate surface. These silanes, as Table I also shows, are characterized by a substantially increased specific current imput (current imput for each batch per time unit) as opposed to the composition without addition of silanes. The addition of the tested silanes of experiments E to K showed no increase in specific flow uptake, or only an unsubstantial increase.

EXAMPLE 2

In a second series of experiments shown in Table II, it is demonstrated that even a covering that is less than 100% monomolecular covering of the specific surface of the added fillers and pigments of composition A suffices to produce the effect claimed according to the invention.

TABLE II

| Experiment | Silane | Monomolecular coat % | Parts by wt. 100 parts by wt. of molding composition A | Throughput (Kg./h.) | Current imput of Extruder (A) | Specific current imput (Ah/kg) | Percentage in current imput | Formation of Deposit Plate surface | Tool |
|---|---|---|---|---|---|---|---|---|---|
| A | (no silane) | — | — | 85 | 26 | 0.306 | — | 3 | 3 |
| L | Vinyl-tri-methoxy- | | | | | | | | |

TABLE II-continued

| Experiment | Silane | Mono-molecular coat % | Parts by wt. 100 parts by wt. of molding composition A | Through-put (Kg./h.) | Current imput of Extruder (A) | Specific current imput (Ah/kg) | Percentage in current imput | Formation of Deposit Plate surface | Tool |
|---|---|---|---|---|---|---|---|---|---|
|  | silane | 20 | 0.017 | 84 | 26 | 0.310 | 12 | 1 | 2 |
| M | Vinyl-tri-methoxy-silane | 50 | 0.042 | 81 | 30 | 0.370 | 20 | 0 | 0 |
| B | Vinyl-tri-methoxy-silane | 100 | 0.085 | 85 | 34 | 0.400 | 31 | 0 | 0 |
| N | Vinyl-tri-methoxy-silane | 500 | 0.42 | 84 | 34 | 0.405 | 32 | 0 | 0 |

The results in Table II show effects of the addition of vinyl trimethoxy silane in various amounts, corresponding to different monomolecular covering of the specific surface of the fillers of mixture A. Here, it appears that in the case of the silanes selected according to the invention, even less than a 100% monomolecular covering is sufficient for the effect to be obtained by the invention. The problem of the invention is solved, i.e. the desired results are achieved, with about 50% covering.

Moreover, it was found that silanes that exert a reinforcing effect on the mechanical properties of a plastic such as PVC are not automatically suitable for the purpose of the invention.

EXAMPLE 3

Contrary to the expectation that the silanes that exert a reinforcing effect on the mechanical properties of a thermoplastic would also prevent separation of fillers, it was found that precisely such silanes are often ineffective for this purpose. In the following Table III these results are shown, with reference to some silane additions taken from Table I, whereby to assess the reinforcing effect, impact strength according to DIN 53 453 at 233° K. and notch impact strength according to DIN 53 453 at 296° K. and 273° K. are presented. The test values were determined on plates prepared under experiments A, B, C, F and K according to Table I.

EXAMPLE 4

A mixture O consisting of:
75 parts by weight of S-PVC, K-value 65
22 parts by weight of DOP (dioctyl phthalate)
3 parts by weight of Epoxidized soybean oil
3 parts by weight of Lead sulfate
1 parts by weight of Lead stearate
0.3 parts by weight of Calcium stearate
1.0 parts by weight of Long-chain wax ester
0.3 parts by weight of Hydroxystearic acid
10 parts by weight of Calcium carbonate (specific surface area about 5 m$^2$/g.)
10 parts by weight of Titanium dioxide was prepared in the same manner as molding composition A in Example 1 and extruded to form a plate. This molding composition O was, in turn, compared with a molding composition P consisting of the basic mixture O and an additive in the form of a silane, proven to be effective in accordance with Table I. This mixture was likewise processed further under the same conditions as composition O. Table IV shows the results.

TABLE IV

| Experiment | Silane | Silane, parts by wt./100 parts by wt. of molding composition O | Through-put (kg./h.) | Current imput (A) | Specific current imput (Ah/kg) | Percentage increase in current imput | Formation of Deposit Plate Surface | Tool |
|---|---|---|---|---|---|---|---|---|
| O | (no silane) | — | 90 | 16 | 0.178 | — | 3 | 3 |
| P | β-Chloroethyl-tri-ethoxy-silane | 0.125 | 84 | 18 | 0.214 | 20 | 0 | 0 |

As can be seen from Table IV, the formation of plate-out on the plate surface and the deposition in the tool is prevented by the addition of β-chloroethoxysilane, there being simultaneously an increase in the specific current imput. The fact that the current imput is not increased to such a great extent in experiment P as in

TABLE III

| Experiment | Silane | Parts by wt./100 parts by wt. of molding composition A | Specific current imput (Ah/kg) | Percentage increase in current imput | Impact Resistance Without Notch 233° K. (*) | With Notch 296° K. | 273° K. | Formation of Deposit Plate surface | Tool |
|---|---|---|---|---|---|---|---|---|---|
| A | (no silane) | — | 0.306 | — | 0 | 4.0 | 3.3 | 3 | 3 |
| B | Vinyl-trimethoxy-silane | 0.085 | 0.400 | 30 | 0 | 4.2 | 3.5 | 0 | 0 |
| C | Vinyl-triethoxy-silane | 0.100 | 0.419 | 37 | 0 | 3.7 | 3.2 | 0 | 0 |
| F | i-Butyl-trimethoxy-silane | 0.100 | 0.289 | −6 | 5 | 6.8 | 4.2 | 3 | 3 |
| K | Chloromethyl-di-methyl-methoxy-silane | 0.250 | 0.287 | −6 | 5 | 7.7 | 4.7 | 3 | 3 |

(*)Number of specimens, among ten tested specimens, without breakage.

experiment D is due to the conversion of the plasticizer in the PVC.

It will be appreciated from the above examples that the desired effects and results of the invention are achieved by the addition of at least one silane which causes an increase in the current imput into the extruder of at least 20%.

What is claimed is:

1. A thermoplastic molding composition which comprises a thermoplastic molding resin, at least one solid filler, and an effective amount of at least one additive for preventing separation of the fillers out of the composition during processing by extrusion, calendering or injection molding, said additive consisting of β-chloroethyl triethoxysilane and said molding resin being polyvinyl chloride.

2. The molding composition of claim 1, wherein the silane is contained in a concentration of $5 \times 10^{-4}$ to 1.0 parts by weight calculated as silicon per 100 parts by weight of the thermoplastic molding composition.

3. The molding composition of claim 1, wherein the quantity of silane within the composition corresponds to a 50% to 100% monomolecular covering of the specific surface of the quantity of filler that tends to separate out in the composition.

4. The molding composition of claim 1, wherein the silane is contained in a concentration of 0.005 to 2 parts by weight calculated as silane per 100 parts by weight of the molding composition.

5. The molding composition of claim 1, wherein the silane is contained in a concentration of 0.02 to 0.5 parts by weight, calculated as silane, per 100 parts by weight of the molding composition.

6. The molding composition of claim 5, wherein the at least one filler is a filler that tends to deposit out during the processing of the molding composition on metallic contact surfaces of a processing apparatus.

7. The molding composition of claim 1, wherein said at least one solid filler is selected from the group consisting of chalk, kaolin, talc, asbestos and titanium dioxide.

8. A process for preventing the separation of fillers and other dispersed additives from thermoplastic molding compositions, during processing by extrusion, calendering or injection molding along metallic contact surfaces of a processing unit which comprises admixing a silane as an additive to a portion of the thermoplastic molding composition containing a thermoplastic molding resin and at least one filler or other dispersed additive that tends to separate out from the molding composition during said processing; processing the portion of the thermoplastic molding composition containing said silane in said processing unit; measuring the electrical energy applied to the processing unit, in processing, per kilogram of molding composition per unit time; determining if the electrical energy applies has been increased by the addition of said at least one silane to said molding composition as compared to the electrical energy required per kilogram of molding composition per unit time for processing another portion of said thermoplastic molding composition free of said silane; thereafter admixing an effective amount of at least one silane, determined to be capable of increasing the applied electrical energy required to process said molding composition by at least 20%, with said thermoplastic molding composition and processing the resultant thermoplastic molding composition in said processing unit.

9. The process of claim 8, wherein the at least one silane is a vinyl trialkoxysilane containing alkoxy groups having from 1 to 6 carbon atoms, β-chloroethyl triethylsilane or a mixture thereof.

10. The process of claim 9, wherein the amount of silane admixed with said molding composition is in a concentration of $5 \times 10^{-4}$ to 1.0 parts by weight calculated as silicon per 100 parts by weight of the thermoplastic molding composition.

11. The process of claim 8, wherein the amount of silane admixed with said molding composition is in a concentration of $5 \times 10^{-4}$ to 1.0 parts by weight calculated as silicon per 100 parts by weight of the thermoplastic molding composition.

12. The process of claim 8, wherein the at least one filler is a filler that tends to deposit out during the processing on the metallic contact surfaces of the processing apparatus.

13. The process of claim 8, wherein the at least one filler is selected from the group consisting of chalk, kaolin, talc, asbestos and titanium dioxide.

14. The process of claim 8 wherein the energy applied is electrical current.

15. The process of claim 8 wherein the molding resin comprises polyvinyl chloride.

16. The process of claim 8, wherein the silane is admixed in a concentration of 0.005 to 2 parts by weight per 100 parts by weight of the molding composition.

17. The process of claim 8, wherein the silane is admixed in a concentration of 0.02 to 0.5 parts by weight per 100 parts by weight of the molding composition.

18. A process for producing a thermoplastic molding composition which prevents the separation of fillers and other dispersed additives from the thermoplastic composition during processing by extrusion, calendering or injection molding in a processing unit which comprises admixing a silane as an additive to a portion of the thermoplastic molding composition containing a thermoplastic resin and at least one filler or other dispersed additive that tends to separate out from the molding composition during said processing; processing the portion of the thermoplastic molding composition containing said silane in said processing unit; measuring the electrical energy applied to the processing unit, in processing, per kilogram of molding composition per unit time; determining if the electrical energy applied has been increased by the addition of said at least one silane to said molding composition as compared to the electrical energy required per kilogram of molding composition per unit time for processing another portion of said thermoplastic molding composition free of said silane; and thereafter admixing an effective amount of at least one of the silanes, determined to be capable of increasing the applied electrical energy required to process said molding composition by at least 20%, with said thermoplastic molding composition.

19. The process of claim 18, wherein said at least one silane is a vinyl trialkoxysilane having from 1 to 6 carbon atoms in the alkoxy groups, β-chloroethyl triethylsilane or a mixture thereof.

20. The process of claim 18, wherein the amount of silane admixed with said molding composition is in a concentration of $5 \times 10^{-4}$ to 1.0 parts by weight calculated as silicon per 100 parts by weight of the thermoplastic molding composition.

21. The process of claim 18 wherein said thermoplastic resin comprises polyvinyl chloride.

22. The process of claim 18, wherein the silane is admixed in a concentration of 0.005 to 2 parts by weight per 100 parts by weight of the molding composition.

23. The process of claim 18, wherein the silane is admixed in a concentration of 0.02 to 0.5 parts by weight per 100 parts by weight of the molding composition.

24. The process of claim 18, wherein the electrical energy applied is electrical current.

25. The process of claim 18, wherein the at least one filler is a filler that tends to deposit out during processing on the metallic contact surfaces of the processing unit.

26. The process of claim 18, wherein the at least one filler is selected from the group consisting of chalk, kaolin, talc, asbestos and titanium dioxide.

* * * * *